United States Patent [19]
Doby

[11] 3,913,130
[45] Oct. 14, 1975

[54] OUTAGE INDICATING APPARATUS FOR METER TELEMETRY SYSTEMS INCLUDING DATA RECORDERS

[75] Inventor: William P. Doby, Raleigh, N.C.

[73] Assignee: Westinghouse Electric Corporation, Pittsburgh, Pa.

[22] Filed: Sept. 26, 1974

[21] Appl. No.: 509,614

[52] U.S. Cl. ................. 360/6; 324/113; 346/14 MR
[51] Int. Cl.² ..................... G01D 9/04; G01R 13/04
[58] Field of Search ......... 360/5, 6; 346/14 MR, 20; 324/110, 113, 114, 142; 235/151.31

[56] References Cited
UNITED STATES PATENTS

| | | | |
|---|---|---|---|
| 3,148,329 | 9/1964 | Lenahan .......................... | 346/14 MR |
| 3,401,395 | 9/1968 | Neher ................................. | 324/113 |
| 3,500,431 | 3/1970 | Baskin ..................................... | 360/6 |
| 3,531,771 | 9/1970 | Jaxheimer ..................... | 346/14 MR |
| 3,678,484 | 7/1972 | Maxwell, Jr. ........................... | 360/6 |
| 3,716,679 | 2/1973 | Graesslin ................................ | 360/6 |
| 3,801,963 | 4/1974 | Chen ...................................... | 360/5 |

Primary Examiner—Terrell W. Fears
Assistant Examiner—Jay P. Lucas
Attorney, Agent, or Firm—R. W. Smith

[57] ABSTRACT

An outage in a quantity measured by a utility meter develops a signal in a data recorder included in a telemetry system to record data signals initiated by the meter. The data signals and time interval signals are recorded as pulses in separate data and time tracks in a recording medium. An outage pulse is recorded in the time track in a different recorded manner than is an interval pulse. In one preferred embodiment of this invention, the recorder records outage pulses at both the beginning and after the end of an outage condition.

10 Claims, 3 Drawing Figures

OUTAGE INDICATING APPARATUS FOR METER TELEMETRY SYSTEMS INCLUDING DATA RECORDERS

CROSS-REFERENCE TO RELATED APPLICATIONS

This invention is related to U.S. Pat. applications Ser. No. 509,612 by W. P. Doby et al, and Ser. No. 509,613 by W. P. Doby et al both filed concurrently with this application, and both assigned to the assignee of this invention.

BACKGROUND OF THE INVENTION

This invention relates to utility metering telemetry systems including a recorder for recording an outage condition along with meter data and time interval information and more particularly to such systems in which the outage is recorded in a time recording track such that pulses indicating the outage have a different characteristic than the time pulses to indicate the time of the outage condition during data translation.

The recording of utility meter readings for extended periods in the order of a month for later translation and calculation of power demand, billing and load survey information of electric utility customers is well known. In U.S. Pat. No. 3,059,239 issued to C. J. Snyder on Oct. 16, 1962; U.S. Pat. No. 3,148,329 issued to B. E. Lenehan on Sept. 8, 1964; U.S. Pat. No. 3,189,821 issued to A. J. Petzinger on June 15, 1965; and U.S. Pat. No. 3,470,470 issued to C. J. Snyder on Sept. 30, 1969, all assigned to the assignee of this invention, magnetic recording devices are described and claimed for recording watthour meter or other meter data pulses and interval pulses. These recorders are operated continuously for extended periods corresponding to monthly billing periods or monthly periods for accumulating meter pulse data for measured quantities such as wind direction as disclosed in U.s. Pat. No. 3,665,759 issued to T. J. Daley on May 30, 1972 and assigned to the assignee of this invention. In U.S. Pat. No. 3,602,458 issued to W. P. Doby et al on Aug. 31, 1971 and assigned to the assignee of this invention, tape cartridge capable of operating for extended recording periods is described and claimed. As noted in these patents, when the beginning and end times of the recording period is known an exact time record of the occurrence of the meter data information is known by correlating real time to the recorded time pulses. Power consumption, maximum demand billing, and peak load information are conveniently calculated from the record tapes, for example, when the recorded data pulses represent kilowatts of power usage by a customer's electric load.

Translation of the recorded data is preferably provided in a translator as described and claimed in U.S. Pat. No. 3,678,484 issued to A. H. Maxwell, Jr. on July 18, 1972 and in U.S. Pat. No. 3,740,724 issued to C. J. Snyder on May 14, 1971 both assigned to the assignee of this invention. The recorded tape in a tape cartridge, as disclosed in the Doby et al U.S. Pat. No. 3,602,458 is rewound and the data is read into the translator in a reverse direction relative to the recorded direction. The translator includes a counting operation to totalize the data pulses recorded on one or more data recording tracks between the time interval pulses. The totalized pulse information along with identifying and other programmed information associated with the data pulses is provided at the output of the translator as described in the Maxwell, Jr. U.S. Pat. No. 3,678,484. The translator output may be provided on computer tape or punched cards for subsequent processing in a commercial computer or provided directly to the input of the commercial computer or also provide a direct teleprinter print-out of billing or other desired power usage data.

One problem that has been noted in some instances is the occurrence of power outages during the metering of the electric power consumption in the aforementioned recorder telemetry systems. When the power outage occurs, the recorder stops and then starts again at the end of the outage. The recorded data and interval pulses appear the same whether there is an interruption in the recording or not. In the U.S. Pat. No. 3,538,406 issued to C. J. Snyder on Nov. 3, 1970, and assigned to the assignee of this invention, a battery powered data recorder is disclosed and claimed. Also, a battery carryover feature may be included in the recorders to operate the recorder from a battery only during power outages. This continues and maintains the tape movement so that all time pulses are recorded over an extended period even when several outages occur. Since no power is being measured the data recording tracks will be blank. When metered electric power consumption is very low or where the power load is turned off, the power outage will not produce a detectable change in the recorder data track. The interval between time pulses can be preselected and in one typical embodiment is 15 minutes. This permits the proper time reference to be maintained during translation of the record tapes recorded when power outage conditions occurred in the power system being monitored.

Without the battery carryover recorder feature the system user typically has a separate record of the time of the outage. When this is known, the times assigned to the data following the outage can be adjusted to approximately compensate for the outage. The accuracy of this compensation is limited to the time between interval pulses on the tape. For example, with a 15 minute interval data recorder, interval pulses following the outage are adjusted in 15 minute increments. Therefore, unless the outage was an even multiple of 15 minutes, the adjusted reading may lag real time by as much as 15 minutes. For many cases this time discrepancy is not important and the data may still be used. In cases where this time difference prohibits use of the data, it is still convenient to know when the power outage occurred so that the data to that point may be accepted and the data following it may be discarded. This procedure becomes difficult to implement and loses its accuracy when two or more outages occur in 1 month. In each of the above identified applications Ser. No. 509,612 filed by W. P. Doby et al, and Ser. No. 509,613 filed by C. J. Snyder, an outage indicating apparatus is described wherein outage indicating pulses are recorded in the same form as are the time interval pulses. The difference in the pulses is only established by their position. Further, there is no indication of the beginning and end of an outage condition.

Accordingly, it is desirable to have an indication of a power outage condition recorded on the recording tape in a different form from the time interval pulse form being recorded in the same recording track. Further it is desirable to record the length and time of the outage in recorders that continue to record the time information during an outage condition so as to signal the outage condition and maintain the recorded data information in the proper time relationship during translation of the information.

SUMMARY OF THE INVENTION

In accordance with the present invention outage indicating apparatus is included in a utility metering telemetry system including a data recorder that records data pulses and time interval pulses and further records outage pulses. The recorder is normally energized by an electrical quantity being measured by a meter generating data pulse information. An auxiliary battery carryover power supply in the recorder continues recorder operation so that time pulse information continues to be recorded.

The data recorder includes an outage indicating circuit connected to a time interval recording circuit. Outage pulses and time interval pulses are recorded in the same recording track with different pulse durations. A recording signal is generated through a time recording head after an outage ends and in one embodiment of this invention, recording signals are generated at both the beginning and after the end of an outage condition.

After an outage condition a short duration outage pulse is recorded at a predetermined position prior to a substantially longer duration time interval pulse. An outage impulse control element is connected in the outage indicating circuit and a time impulse control element is connected in a time recording circuit. The outage impulse control element is actuated at regular intervals at the same rate as is the time impulse control element. The time impulse control element is effective to generate a current signal through a time interval recording head circuit and produce a recorded time interval pulse in the recording medium. The recorder outage indicating circuit is responsive to the presence of the quantity being measured by an outage detecting device including a switching control member that is rendered to one conducting condition when the measured quantity is present and is rendered to an opposite conducting condition when there is an interrruption or an outage in the presence of the measured quantity. The switching control member is initially operated in one direction between the two conducting conditions in response to the beginning of an outage condition and is operated in a reverse direction between the two conducting conditions by the return of the measured power quantity. A return-to-power (RP) outage pulse is produced in the time recording head circuit in response to the second and reverse direction of operation of the switching control member. In one preferred embodiment a loss of power (LOP) outage pulse is also produced in the time recording head circuit in response to the initial and one direction of operation of the switching control member. The outage pulses are of a substantially shorter duration than are the time interval pulses. An RP outage pulse is recorded in the time recording track at a predetermined position prior to a subsequently recorded time interval pulse. While the measured quantity is continuously present, the first conducting condition of the switching control member renders the outage indicating circuit inactive to prevent a recorded outage pulse in response to actuation of the outage impulse control element. The time impulse and outage impulse control elements are actuated at different predetermined times such that an outage pulse is recorded before an interval pulse on the recording medium. The predetermined spacing is within one-tenth of the interval spacing between time interval pulses and a recorded position approximately 5 percent before the end of an interval following an outage condition is preferred.

A data translator is operated to process the recorded outage pulses recorded in accordance with this invention. The translator includes apparatus including an outage indicating circuit.

It is an important feature of this invention to provide a utility metering telemetry system for monitoring electric power consumption of a customer's electric load and having a data magnetic recorder for recording watt demand indicating data pulses in one recording track and time interval pulses in a time track with outages in the measured electric power being recorded in the time track before an interval pulse with the outage pulses having a different recorded pulse duration than the recorded time interval pulses. A further feature of this invention is to magnetically record time interval pulses in a return-to-bias (RB) mode for an extended pulse time and record the outage pulses in an RB mode for a short pulse time while data pulses are magnetic recorded in a non-return-to-zero (NRZ) mode. Another feature of this invention is to record LOP and RP outage pulses in short RB mode pulses at the beginning of an outage and at a predetermined position prior to a time interval pulse recorded after a power outage. Other advantages and features will be apparent from the detail description of the drawing hereinbelow.

DESCRIPTION OF THE PREFERRED EMBODIMENTS

Figure 1:
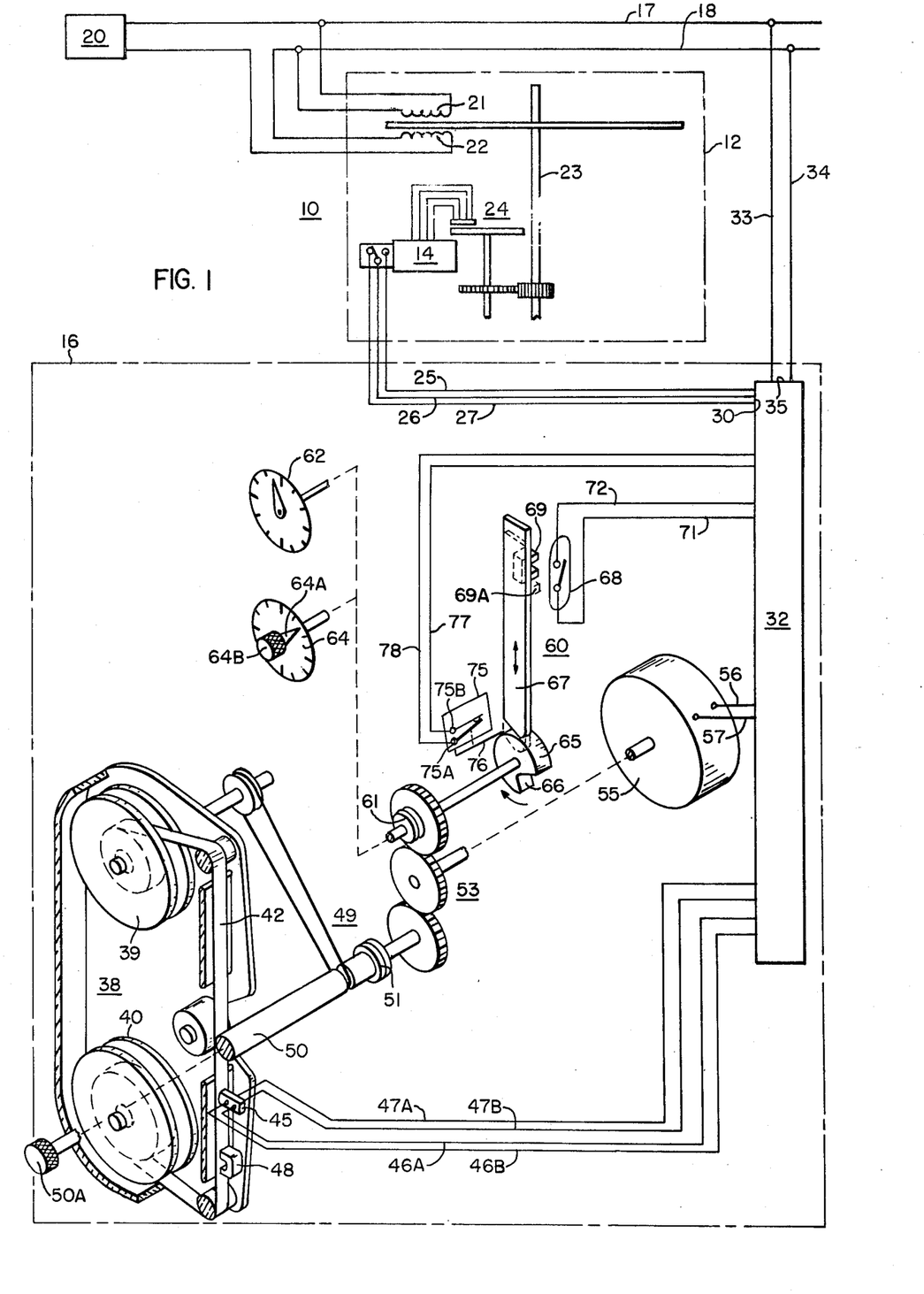
FIG. 1 is a schematic view of a utility metering telemetry system including a data recorder having parts shown in perspective and including outage indicating apparatus made in accordance with this invention.

Referring now to the drawings wherein throughout the several figures the same numeral designates the same or like elements and more particularly to FIG. 1 wherein there is shown a telemetry system 10 including an electric utility meter 12 provided by an integrating induction type watthour meter, a pulse generator 14 associated with the meter 12, and a data recorder 16 made in accordance with the present invention. The quantity of electric power supplied from a utility company through conductors 17 and 18 to a customer's electric load 20 is measured by the meter 12. The voltage winding 21 and current winding 22 of the meter 12 are connected to the conductors 17 and 18 in a well-known manner. The meter disc shaft 23 is driven at a rate proportional to the rate of consumption of electrical energy by the load 20. The pulse generator 14, includes a radiometric pulse initiator as disclosed and claimed in U.S. Pat. No. 3,722,493 issued to T. M. McClelland, III on May 15, 1973 and commercially available as a Type CD-22 photoelectric ppulse initiator described in descriptive bulletin I.L. 42-570 dated December, 1971 and available from Westinghouse Electric Corporation, Meter Division, Raleigh, North Carolina. Other known three-wire contact devices which are operative to alternately effect contact closures between a common terminal and two oppositely poled terminals connected to the ends of three conductors 25, 26 and 27 at the pulse generator 14. The other ends of the conductors 25, 26 and 27, forming a so-called three-wire telemetry circuit, are connected to a data input 30 of the recorder 16.

The data recorder 16 is a modified form of the demand magnetic tape recorder described in descriptive bulletin I.L. 42-565WR-2 dated April, 1972 and available from Westinghouse Electric Corporation, Meter Division, Raleigh, North Carolina. The recorder includes the general features of the recorders described in the aforementioned descriptive bulletin except for the inclusion of the outage indicating apparatus of this invention. For a better understanding of this invention, the general features of the recorder are described hereinafter.

The three-wire telemetry conductors 25, 26 and 27 are connected to the data input 30 of the recorder circuits 32 illustrated as a circuit block in FIG. 1 and described in detail in connection with the description of FIG. 2 hereinbelow. The recorder circuits 32 are supplied electric power from the conductors 17 and 18 supplying the 60 Hz electric power quantity to the load 20 which quantity is measured by the meter 12. The conductors 33 and 34 are connected between the recorder power input 35 and the conductors 17 and 18.

A tape cartridge 38 as described in the aforementioned Doby U.S. Pat. No. 3,602,458 includes a take-up reel 39 and supply reel 40 carrying a recording medium formed by a magnetic tape 42. The tape a length of slightly over 500 feet is capable of recording for an extended period of approximately 36 days with time interval pulses recorded at fifteen minute intervals as described hereinbelow. The cartridge 38 is removable from the recorder 16 to be transported to a central data translating center having a translator system also described hereinbelow.

A plural track recording head 45 includes at least one data magnetic recording circuit and a time interval magnetic recording circuit. Wire conductors 46A and 46B conduct data pulse current signals and wire conductors 47A and 47B conduct time interval pulse current signals produced in the circuits 32 to the magnetic recording circuits of the head 45. A permanent magnet 48 is positioned adjacent the tape 42 to magnetically saturate the tape in one direction or polarity of magnetization. The tape is magnetized before passing the record heads.

A tape drive mechanism 49 drives a capstan 50 through a one-way clutch 51. A knob 50A on the capstan 50 advances the tape 42 for initial tape positioning. The mechanism 49 is driven by a gearing arrangement 53 driven from a synchronous timing motor 55. The motor 55 is energized from the recorder circuits 32 through conductors 56 and 57. The tape drive mechanism 49 drives the tape 42 at a speed of 7 inches per hour when recording time interval pulses every 15 minutes during a data recording period of approximately 36 days.

A recorder timing mechanism 60 is driven from a second one-way clutch 61 and includes a clock 62, an interval indicator 64 with a pointer 64A fixed to an interval knob 64B. The timing mechanism 60 initiates time interval signals and outage signals in the recorder circuits 32 as described hereinbelow. A circular interval cam 65 is driven commonly with the clock 62 and the interval indicator 64. A cam slot 66 in the edge of cam 65 releases a cam follow 67 engaging the periphery of the cam 65 from an upper position shown in solid lines to a lower position shown in broken lines.

A time interval impulse control element includes a magnetically responsive, normally open, reed switch 68 and a permanent magnet 69 carried by the cam follower 67. The magnet 69 is positioned so that the reed switch 68 is in a non-conducting operative state when the magnet 69 is in the upper position and it is in a conducting operative state when the magnet 69 is in the lower position as indicated by the broken lines 69A. The contacts of the reed switch 68 are connected to the recorder circuits 32 by the conductors 71 and 72. The time the reed switch contacts are closed is controlled by the rotational speed of the cam 65 and the width of the cam slot 66. Preferably the reed switch closes for 7 to 10 per cent of the time between interval pulses. The reed switch closure time is between 60 to 90 seconds when the tape 42 is driven at the seven inches per hour speed.

In accordance with the present invention, an outage impulse control element is formed by a microswitch 75 including an actuator 76 forming a cam follower by engaging the periphery of the cam 65. The conductors 77 and 78 connect the contacts of the switch 75 to the recorder circuit block 32. The actuator 76 is positioned so that the clockwise rotation of the cam 65 causes the cam slot 66 to operate the actuator 76 to a lower position and operate the switch 75 between alternately closed and opened states between the switch terminals 75A and 75B.

Figure 2:
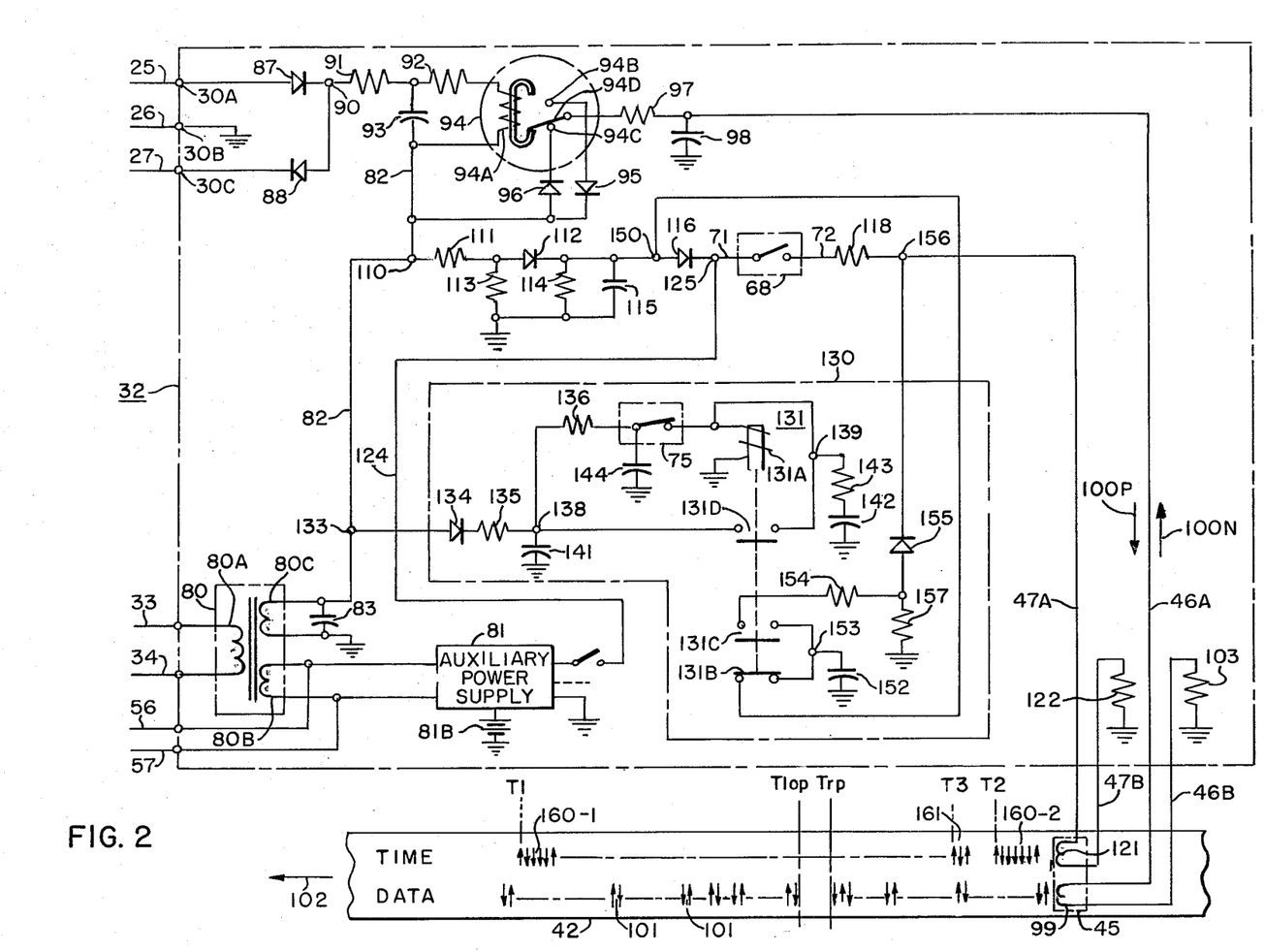
FIG. 2 is an electrical circuit diagram of one preferred form of the recording circuits included in the data recorder illustrated in FIG. 1.

Having described the peripheral parts of the recorder 16 reference is now made to FIG. 2 illustrating a detail electrical diagram of the recorder circuits 32. A recorder power supply 80 is formed by a transformer having a primary winding 80A connected to the conductors 33 and 34. Typically, 120 or 240 volts occurring across the conductors 17 and 18 is applied across the primary winding 80A. Two secondary windings 80B and 80C are provided such that the winding 80B is connected to the conductors 56 and 57 to supply an appropriate voltage to the timing motor 55. The 60 Hz output of the power supply 80 controls the speed of the timing motor 55 to correspond to the frequency of the electric power in the load conductors 17 and 18 since it is a synchronous type motor.

An auxiliary power supply 81 including a 60 Hz vibrator and transfer relay and a battery 81B is connected across the secondary winding 80B. Transfer contacts 81C are closed upon loss of power at the conductors 33 and 34 which occurs when a power outage condition develops in the conduit 17 and 18. The auxiliary power supply 81 then supplies the timer motor 55 and the time interval recording portion of the recorder circuits 32 as described hereinbelow.

The secondary winding 80C provides an alternating current electric source at a predetermined voltage for the recorder data, time interval, and the outage recording circuits. A supply conductor 82 is connected to one terminal of the winding 80C and the other terminal thereof is connected to the circuit ground. A filter capacitor 83 is connected across the secondary winding 80C.

The terminals 30A, 30B and 30C at the data input 30 are connected to the conductors 25, 26 and 27, respectively, from the three-wire contact device of the meter pulse generator 14. One of oppositely poled ends of diodes 87 and 88 in the data recording circuit are connected in series with the terminal 30A and 30C respectively. The terminal 30B is connected to the common circuit ground. The remaining ends of the diodes 87 and 88 are connected together and to the junction 90 for connection to the supply conductor 82. The junction 90 is connected through a filtering circuit including resistors 91 and 92 and capacitor 93 to a relay 94 having a coil 94A and contacts 94B and 94C. Diodes 95 and 96 are connected to the contacts 94B and 94C in opposite polarity relationship. The diodes 95 and 96 are further connected to the supply conductor 82. The switch arm 94D of the relay is is connected through a filtering resistor 97 and capacitor 98 to the conductor 46A and a coil 99 of the magnetic recording circuit of the head 45. The conductor 46B connects the other end of the coil 99 to the circuit ground through a resistor 103 to complete the data magnetic record circuit.

The relay 94 isolates the recorder circuits from the external inputs. The diodes 95 and 96 rectify the supply current of conductor 82 so that with each predetermined quantum of kilowatts measured by the meter 12, the position of the three-wire contact device is changed and latched in position to initiate a new data impulse in the recorder. Accordingly, as the pulse generator 14 effects a latched contact connection between terminals 30A and 30B current flows in one direction through the relay coil 94A and current in the direction of directional arrow 100P flows through the recording head coil 99. This is because diode 96 conducts the positive half wave of the winding 80C current output and causes the positive half wave current to flow through switch arm 94D into the coil 99. When the terminals 30B and 30C are connected together by the next data output impulse of the pulse generator 14, current flows in an opposite direction through the relay coil 94A and the diode 95 conducts the negative half wave current appearing at the conductor 82. Thus, negative half wave current is supplied through the data record coil 99 as indicated by the directional arrow 100N. Current is continuously flowing in the coil 99 in either of the opposite directions. Accordingly, data pulses 101 are recorded in a non-return-to-zero (NRZ) fashion in the data track of the magnetic tape 42 when it is fed in the direction of directional arrow 102 in the recorder 16 as illustrated at the bottom of FIG. 2. Thus, each of the pulses 101 represents a transition between opposite polarity magnetized portions in the data track of the magnetic tape 42. As noted hereinabove, the tape is premagnetized in one polarity of magnetization by the magnet 48 shown in FIG. 1.

Referring now to the time interval recording circuit portion of the recorder circuits 32, a junction 110 of the supply conductor 82 is connected in series with a resistor 111 and a diode 112 with resistors 113 and 114 being connected at opposite poles of the diode 112 and to the circuit ground. A capacitor 115 is connected across the resistor 114 to supply a rectified current signal to a diode 116 connected in series with the diode 112 and the junction 110. The contacts of the reed switch 68 are connected in series with a resistor 118 and to the conductor 47A connected to the time recording head coil 121 which is connected in series with the circuit ground through a resistor 122. A conductor 124 is connected between the auxiliary power supply 81 and the circuit junction 125 between the diode 116 and the reed switch 68. The auxiliary power supply conductor 124 supplies the contacts of the reed switch 68 when a power outage occurs causing deenergization of the normal power supply 80 and closing of the transfer contacts 81C.

Referring now to the power outage indicating circuit 130 made in accordance with the present invention, an outage detector including a switching control device is formed by a relay 131 having a relay coil 131A which controls the relay contacts 131B, 131C and 131D. At a junction 133 with the supply conductor 82, a diode 134 is connected in series with a resistor 135. A resistor 136 is connected in series with the resistor 135 and the contacts of the microswitch 75. The relay coil 131A is connected between the microswitch 75 and the ground. The relay contacts 131D form latching or holding contacts by being connected between the junction 138 between the resistors 135 and 136 and the junction 139 formed between the microswitch 75 and the relay coil 131A. A capacitor 141 is connected between the junction 138 and the circuit ground. A capacitor 142 is connected in series with a resistor 143 and between the junction 139 and the circuit ground. Another capacitor 144 is connected between the microswitch 75 and the circuit ground.

The relay contacts 131B and 131C are connected in series between a junction 150 between the diodes 112 and 116 in the time recording circuit portion of the recorder circuits 32. A storage capacitor 152 is connected between the junction 153 formed at the common terminals of the switch contacts 131B and 131C and the circuit ground. A resistor 154 is connected in series with the contacts 131C and a diode 155 which is further connected in series to a junction 156 connected with the conductor 47A and a time recording head coil 121. A resistor 157 is connected across the junction between the resistor 154 and the diode 155 and the circuit ground.

During each rotation of the interval cam 65 the reed switch 68 is operated to apply current from the conductor 82 through the time recording head 121 to provide an extended return-to-bias (RB) recorded pulse on the tape 42 at each time interval as indicated at times T1 and T2 as shown in FIG. 2. The extended return-to-bias (RB) is understood to be formed by the closing of the contacts of the reed switch 68 which is controlled by the configuration of the cam slot 66 in the cam 65. This applies current through the time recording head 121 for a predetermined time, for example, in the order of 60 to 90 seconds so that the tape is magnetized in an opposite magnetic saturation for the 60 to 90 second period and then returns to the opposite magnetization state as provided by the pre-magnetization of the magnet in the recorder. The arrows in the time and data tracks indicate the opposite states of magnetized saturation. The consecutive arrows pointing down represent the time or duration of magnetically recorded pulses in the time track of the recording tape 42 in FIG. 2. Interval pulses 160-1 and 160-2 recorded at times T1 and T2 are shown longer than the outage pulse 161 at time T3 but the lengths are not in scale since outage pulse 161 is substantially shorter as noted hereinbelow.

Figure 3:
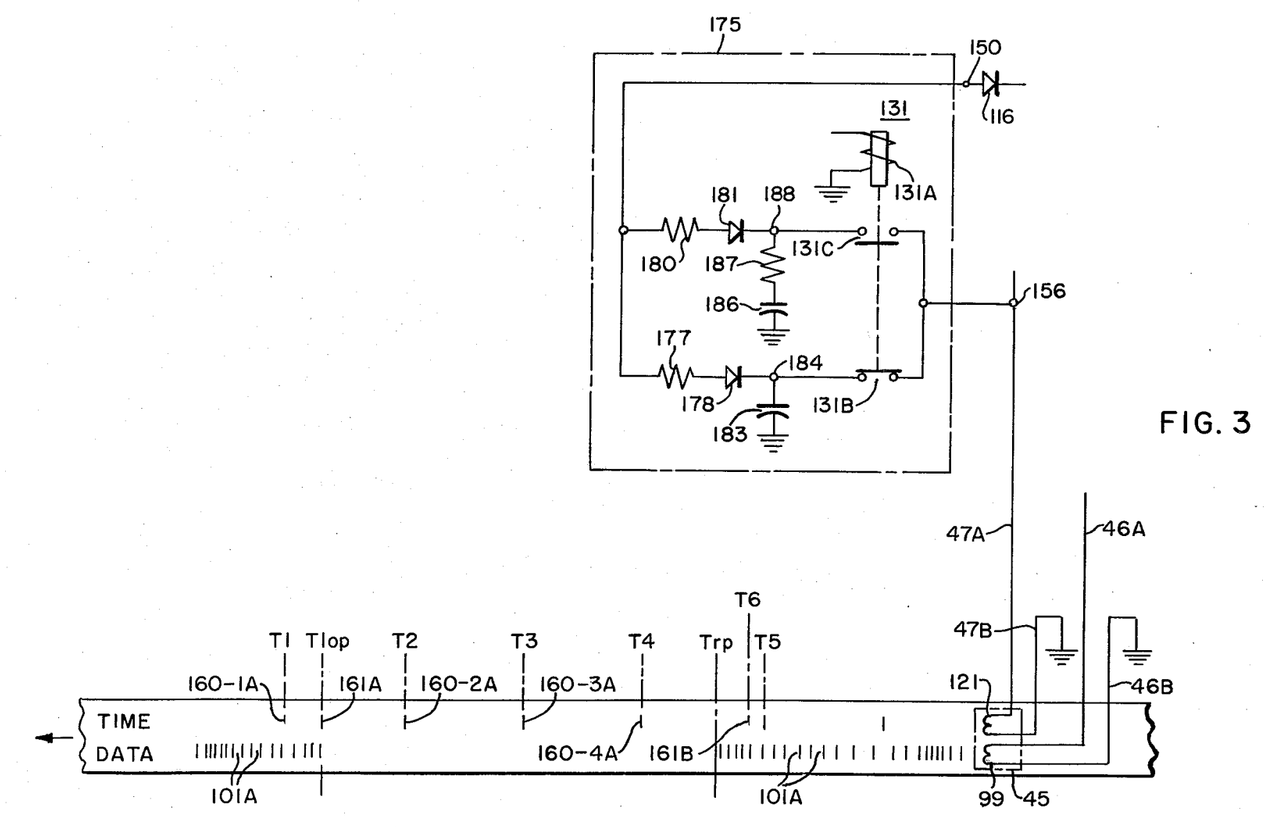
FIG. 3 is a fragmentary electric circuit diagram for replacing a portion of the circuit diagram illustrated in FIG. 2.

In the outage indicating circuit 30, the relay coil 131 will be normally energized and the holding contacts 131D will maintain the relay coil 131A in an energized state even though the contacts of the microswitch 75 will open and then close again at approximately 5 percent before the reed switch 68 is operated, i.e. 5 percent before the end of the time interval. Upon an outage condition occurring at time T1op the charge on the capacitor 142 is applied across the relay coil 131A for a brief time, in the order of 4 to 8 seconds to provide a guard time to prevent deenergization of the relay coil 131A due to a momentary power outage. When the relay coil 131A is deenergized the contacts assume the conductive states as shown in FIG. 3. Accordingly, the contacts 131B are conductive and the contacts 131C are non-conductive and the holding contacts 131D are non-conductive. Upon return to power at the time Trp, the relay coil 131 does not energize immediately and the current through the microswitch contacts is blocked by the high resistance of a resistor 136 so as to prevent energization of the relay coil 131. The capacitor 141 is charged from the circuit junction 133 but the capacitor 142 is not charged due to the low resistance of the relay coil 131 shorting it. During this time, the capacitor 152 is charged through the closed contacts 131B. As the cam turns further, so as to close the microswitch contacts, the capacitor 141 discharges and energizes the relay coil 131A closing the holding contacts 131D and closing contacts 131C and opening the contacts 131B. This then, discharges the capacitor 152 through the junction 156 and through the time recording head 121 to provide a short duration return-to-bias (RB) pulse at the time T3 approximately 5 percent of the time interval before the interval pulse 160-2 at time T2. The discharge current of the capacitor 152 is of substantially shorter duration, in the order of 200 microseconds, than the 60 to 90 second duration of the extended RB recorded interval pulses 160-1 and 160-2.

In FIG. 3 there is illustrated a fragmentary electrical circuit diagram of the recorder circuits shown in FIG. 2 including an alternative recorder outage indicating circuit 175 included within the broken line circuit block which is to replace the portion of the circuit in the broken line circuit block 130 in FIG. 2 including the branch circuit portion including the relay contacts 131B and 131C connected between the circuit junctions 150 and 156. The circuit 175 provides short return-to-bias recorded outage pulses 161A and 161B in a recording tape 42A. The pulse 161A and 161B are recorded at time T1op at the beginning of an outage condition and after a time Trp when the power in the conductors 17 and 18 returns at the end of an outage condition. The pulse 161B is recorded at the predetermined position at time T6 immediately before the interval pulse 160-5A and in the same interval that the outage ended. The tape 42A is fed by the recorder mechanism described in connection with the description of FIG. 1. The conditions represented by the recorded tape 42A indicate that an outage occurring at time T1op after the time T1 and thereafter until time Trp the auxiliary power supply 81 shown in FIG. 2 energized the timer motor 55 and the time interval recorder circuits. Thus, the interval pulse 160-2A, 160-3A and 160-4A are recorded at the times T2, T3 and T4 when the auxiliary power supply 81 is operative during deenergization of the power supply 80. The time interval pulses are spaced at fifteen minute intervals although alternative intervals may be provided within the scope of this invention.

The circuit 175 includes two parallel circuit paths from the junction 150 including resistor 177 and diode 178 and the relay contacts 131B in one circuit path and resistor 180 and diode 181 and the relay contacts 131C in the other path. The relay coil 131A operates the contacts 131B and 131C as described in connection with the description of the circuit 130 shown in FIG. 2. A storage capacitor 183 is connected between the circuit junction 184 located between the diode 178 and the contacts 131B and the circuit ground. A second storage capacitor 186 is connected in series with a resistor 187 and the series elements are connected between the circuit junction 188 located between the diode 181 and the relay contacts 131C and the circuit ground. A common terminal junction 190 between the contacts 131B and 131C is connected to the junction 156 with the conductor 46A. This connection forms discharge circuit paths from the capacitors 183 and 186 to the time recording head coil 121.

In operation of the outage indicating circuit 175 and upon initial installation and application of power to a recorder including the circuit 175, the interval knob 64B is turned through a complete interval in order to energize the relay coil 131 shown in FIG. 2. This is to be done before the cartridge 38 is installed in the recorder. The contacts 131B will be open or in a non-conducting state and the contacts 131C will be closed and in conducting state by the energization of the relay coil 131A. The capacitor 183 is charged from the junction 150.

Upon a power interruption occurring for at least 4 to 8 seconds at the time T1op in FIG. 3, the relay coil 131A is deenergized closing the contacts 131B and opening the contacts 131C. The capacitor 183 discharges through the contacts 131B and through the time recording reed coil 121 to record the short RB mode of recorded pulse 161A. The auxiliary power supply 81 will continue operation of the recorder to record the time interval pulses 160-2A, 160-3A and 160-4A. Since no power exists in the conductors 17 and 18 there will be no data or power demand information pulses 101 recorded during the outage condition.

When power returns at the end of the outage condition at the time Trp, the data pulses 101 begin to be recorded but the relay coil 131 will not be reenergized until the microswitch 75 is operated by the cam 65 as described hereinabove. Upon energization of the relay coil 131A at approximately 5% before the end of the interval, at the time T6 immediately prior to the interval time T5, the contacts 131C close and the contacts 131B open. The capacitor 186 was charged through the diode 181 and resistors 180 and 187 after the end of the outage condition at the Trp and before the time T6. Thus, when the contacts 131C close at the time T6 the capacitor 186 discharges into the recording head coil 121. Thus records the short RB mode recorded return-to-power RP pulse 161B at approximately 5 percent of an interval prior to the time interval pulse 160-5A. Since the time interval pulses 160-1A, 160-2A, 160-3A, 160-4A and 160-5A are recorded as described hereinabove, they are recorded in the extended return-to-bias (RB) mode and have substantially longer duration than the outage pulses 161A and 161B as also noted hereinabove.

While the invention described hereinabove is in accordance with preferred embodiments described, other alternative embodiments may be made without departing from the spirit and scope of my invention.

We claim:

1. A data recorder for recording metering information of a measured quantity subject to interruptions during outage conditions, comprising:

a data input for receiving pulses responsive to predetermined amounts of a measured quantity;

a time impulse control means actuated at regular time intervals;

an outage detector including a switching control means having a one conducting condition in response to presence of said measured quantity and an opposite conductive condition in response to the absence of said measured quantity;

a continuously energized data recording circuit means connected to said data input to generate data recording pulses in response to the pulses received at said data input;

a time recording circuit means including said time impulse control means for periodically energizing the time recording circuit means so as to generate time interval pulses having a predetermined time duration in response to each actuation of said time impulse control means;

an outage indicating circuit means including said switching control means, said outage indicating circuit means being connected to said time recording circuit means for periodically energizing the time recording circuit means for a substantially shorter time duration than does said time impulse control means to generate a separate outage pulse in said time recording circuit in response to said switching control means being operated between said one and said opposite conducting conditions such that said outage pulse is produced in a predetermined relationship prior to a time interval pulse generated after an outage condition in said measured quantity with said outage pulse having a substantially shorter duration than said time interval pulses.

2. The data recorder as claimed in claim 1 including an outage impulse control means connected in said outage indicating circuit, said outage impulse control means being actuated at the same regular time intervals as said time impulse control means with a predetermined time period occurring between the times that said time impulse control means and said outage impulse control means are actuated, said outage impulse control means being effective to initiate said outage pulse when said switching control means is operated between said one and said opposite conducting conditions.

3. The data recorder as claimed in claim 2 including a magnetic tape recording medium; a first magnetic recording head circuit connected in said data recording circuit for producing recorded data pulses in one track of said recording medium; a second magnetic recording head circuit connected to said time recording circuit means for producing recorded time interval pulses and outage pulses in a second track of said recording medium with said interval pulses being recorded in an extended return-to-bias mode of magnetic recording and said outage pulses being recorded in a short return-to-bias mode of magnetic recording.

4. The data recorder as claimed in claim 3 including a timing mechanism having a timing motor and a cam rotated by said motor with said time impulse control means and said outage impulse control means both being actuated at different predetermined rotated positions of said cam.

5. The data recorder as claimed in claim 4 wherein said pulses received at said data input are responsive to predetermined amounts of electric power measured by a watthour metering device initiating said data pulses, and wherein said switching control is energized and de-energized directly by the electric power being measured to establish operation between said first and second conducting states in response to an outage condition of the electric power.

6. The data recorder as claimed in claim 5 including a first power supply means connected to said electric power being measured for energizing the respective recorder circuit means and said timing motor; and a second power supply means including a battery for energizing the respective recorder circuit means and said timing motor when an outage condition occurs in the electric power being measured.

7. The data recorder as claimed in claim 6 including a capacitor connected in said time recording circuit to said switching control means so as to be alternately connectable in a charging circuit connected to the first power supply means and in a discharging circuit connected to the second magnetic recording head circuit such that the cam operation of the time impulse control means establishes the extended return-to-bias recorded time interval pulses and the discharge of said capacitor establishes each short return-tobias recorded outage pulse.

8. A data recorder for recording metering information of a measured quantity subject to interruptions during outage conditions, comprising:

a data input for receiving pulses responsive to predetermined amounts of a measured quantity;

a time impulse control means actuated at regular time intervals;

an outage detector including a switching control means having a one conducting condition in response to presence of said measured quantity and an opposite conducting condition in response to the absence of said measured quantity;

a continuously energized data recording circuit means connected to said data input to generate data recording pulses in response to the pulses received at said data input;

a time recording circuit means including said time impulse control means for periodically energizing the time recording circuit means so as to generate time interval pulses having a predetermined time duration in response to each actuation of said time impulse control means;

an outage indicating circuit means including said switching control means, said outage indicating circuit means being connected to said time recording circuit means for periodically energizing the time recording circuit means for a substantially shorter time duration than does said time impulse control means to generate two outage indicating pulses in said time recording circuit in response to said switching control means being firstly operated from said one to said opposite conducting condition such that a first outage indicating pulse is produced at the beginning of the outage condition and said switching control means being secondly operated from said opposite to said one conducting condition such that a second outage indicating pulse is produced in a predetermined relationship prior to a time interval pulse generated after an outage condition in said measured quantity, with said first and second outage pulses having a substantially shorter duration than said time interval pulses.

9. The data recorder as claimed in claim 8 including a magnetic tape recording medium; a first magnetic recording head circuit connected in said data recording circuit for producing recorded data pulses in one track of said recording medium; a second magnetic recording head circuit connected to said time recording circuit means for producing recorded time interval pulses and outage pulses in a second track of said recording medium with said interval pulses being recorded in an extended return-to-bias mode of magnetic recording and said outage pulses being recorded in a short return-to-bias mode of magnetic recording; and first and second capacitors connected in said time recording circuit to said switching control means so as to be alternately charged and then discharged through said second recording head circuit such that said first capacitor is discharged to produce said first outage indicating pulse and said second capacitor is discharged to produce said second outage pulse.

10. The data recorder as claimed in claim 9 wherein said pulses received at said data input are responsive to predetermined amounts of electric power measured by a watthour metering device initiating said data pulses, wherein said switching control means is energized and deenergized directly by the electric power being measured to establish operation between said first and second conducting states in response to an outage condition; and wherein the recorder further includes a first power supply connected to said electric power being measured for energizing the respective recorder circuit means and the timing motor; and the recorder still further includes a second power supply including a battery for energizing the respective recorder circuit means and the timing motor upon an outage condition occurring in the electric power being measured.

* * * * *